UNITED STATES PATENT OFFICE.

ROBERT MAY CAFFALL, OF ST. LOUIS, MISSOURI.

IMPROVEMENT IN DISINFECTANTS AND DEODORIZERS.

Specification forming part of Letters Patent No. 222,453, dated December 9, 1879; application filed August 15, 1879.

*To all whom it may concern:*

Be it known that I, ROBERT MAY CAFFALL, of the city of St. Louis, Missouri, have made a new and useful Improvement in Disinfecting, Deodorizing, and Antiseptic Compounds, of which the following is a full, clear, and exact description.

The present compound is used in a liquid form, and it is valuable as a disinfectant, a deodorizer, and an antiseptic. It is composed of chlorine-water, alum, and a chloride of iron, in combination, and substantially as follows: Take ten parts, by weight, of water saturated with chlorine-gas. To this add, of alum, two parts, and of chloride of iron from four to six parts.

On account of its cheapness, efficiency, and non-poisonous nature I prefer the chloride of iron, and in the form of a perchloride.

In use the compound can be, and preferably is, mixed with water, taking one part of the compound to any desired proportion of water up to one hundred parts of the latter.

The compound is valuable especially for its efficiency and its adaptation to general use, as it can be applied to all the various purposes that disinfecting, deodorizing, and antiseptic compounds or substances are commonly used for. It will act in sea-water. It does not spoil on exposure. It is innocuous and inexpensive.

I am aware that the various ingredients above named have heretofore been separately used, and hence I do not claim them broadly; but What I do claim is—

The compound consisting of chlorine-water, alum, and perchloride of iron, in the proportions named, and for the purposes described.

ROBERT MAY CAFFALL.

Witnesses:
 CHAS. D. MOODY,
 CHARLES PICKLES.